Inventor
Harold Hodkinson
by Benj. T. Raucher
attorney

June 2, 1964 H. HODKINSON 3,135,360

SLACK ADJUSTER FOR DISC BRAKES

Filed Sept. 11, 1962 2 Sheets-Sheet 2

Inventor
Harold Hodkinson
by Benj. T. Rauber
attorney

United States Patent Office 3,135,360
Patented June 2, 1964

3,135,360
SLACK ADJUSTER FOR DISC BRAKES
Harold Hodkinson, Finham, Coventry, England, assignor to Dunlop Rubber Company Limited, London County, England, a British company
Filed Sept. 11, 1962, Ser. No. 222,820
Claims priority, application Great Britain Sept. 16, 1961
5 Claims. (Cl. 188—73)

This invention relates to disc brakes and particularly to friction pad retraction devices therefor.

Disc brakes are known of the knid comprising a pair of pressure plates axially aligned one on each side of a disc and angularly movable to bring friction pads into engagement with the braking surfaces thereof. A retraction device is described in U.K. patent specification No. 883,417 which comprises a straight member associated with a pressure plate and being deformable as wear on the friction pad increases but having sufficient inherent resilience to move the pressure plate and friction pad away from the disc by a predetermined distance after each brake application.

The object of the present invention is to provide a disc brake having an improved retraction device of this type.

According to the invention a disc brake comprises a rotatable disc and a friction pad movable axially with respect to the disc to frictionally engage said disc, the friction pad being associated with a non-rotatable support to locate the pad in a fixed angular position relative to the axis of the disc, means for effecting said frictional engagement, and a retraction device for moving the pad away from the disc, said device comprising a member secured at one end to the non-rotatable support and associated at its other end with the pad, the member having a crank shaped portion between its ends capable of undergoing torsional deformation when the pad is moved towards the disc and having sufficient inherent torsional resilience to retract the pad from the disc a predetermined amount when the braking pressure is removed.

According to the invention also, a disc brake comprises a rotatable disc and a pair of axially-aligned friction pads carried on pressure plates located on opposite sides of the disc, the pressure plates being pivotally mounted on a non-rotatable support, means being provided for angularly moving the pressure plates about their respective pivots to effect frictional engagement between the friction pads and the disc, and a pair of retraction devices for the pads, each device comprising a member secured at one end to the non-rotatable support and associated at its other end with the pressure plate carrying the pad, the member having a crank shaped portion adjacent the support capable of undergoing elastic torsional deformation when the pad is moved towards the disc and permanent torsional deformation as the pad wears, said cranked portion having sufficient torsional resilience to retract the pad to a minimum predetermined distance from the disc after each braking application, when the braking pressure is removed, as the pad progressively wears.

Preferably, in a disc brake as defined in the preceding paragraph, the members forming the pair of retraction devices are joined to form a U-shaped structure the base of which is secured to the non-rotatable support.

One embodiment of the invention will now be described with reference to the accompanying drawings, in which.

Figure 1:
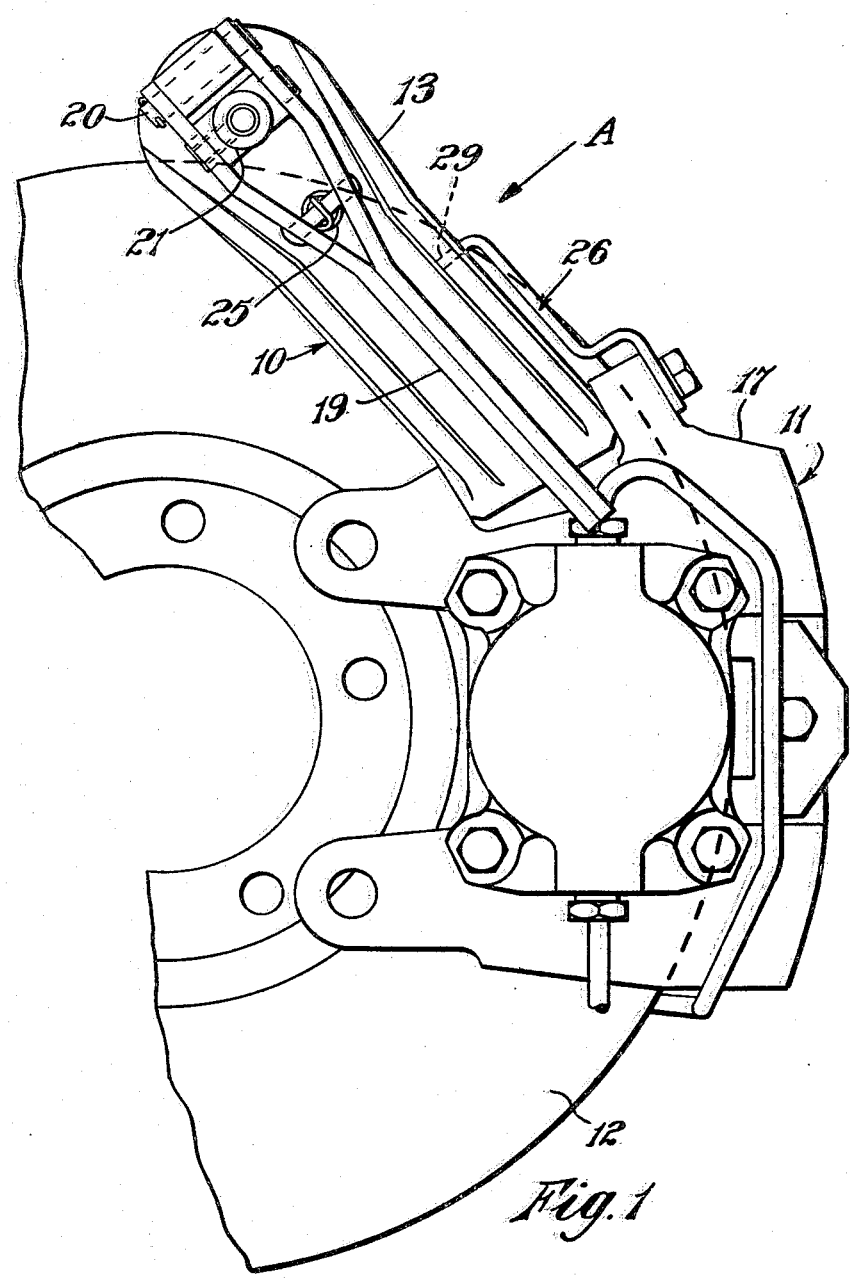
FIGURE 1 is a side view of an assembly incorporating a disc brake in accordance with the invention.

A disc brake mechanism 10 incorporating retraction devices according to the present invention, and designed for operation as a handbrake for a motor vehicle, is shown in FIGURE 1 in association with a hydraulically-operated footbrake mechanism 11 of conventional design, both mechanisms 10 and 11 being arranged to operate on an annular disc 12 which is rotatable with a wheel or shaft (not shown). The brake mechanism 10 comprises a pair of axially-aligned pressure plates 13 and 14 disposed one on each side of the disc 12 and connected at one each of their ends by pivots 15 and 16 respectively to a non-rotatable support consisting of the housing 17 of the footbrake mechanism 11. The housing 17 is secured to a non-rotatable part of the vehicle to which the brake is fitted.

The other ends of the pressure plates 13 and 14 project beyond the outer periphery of the disc 12 and an operating rod 18 extending axially of the disc adjacent the outer periphery is connected to the pressure plate 14 at one end and to an operating lever 19 attached by a pivot 20 to the end of the pressure plate 13 and extending towards the pivot 15 of that plate. The operating rod 18 is connected to the lever 19 slightly inwardly of its pivot 20 by an automatic adjustment device 21.

Figure 2:
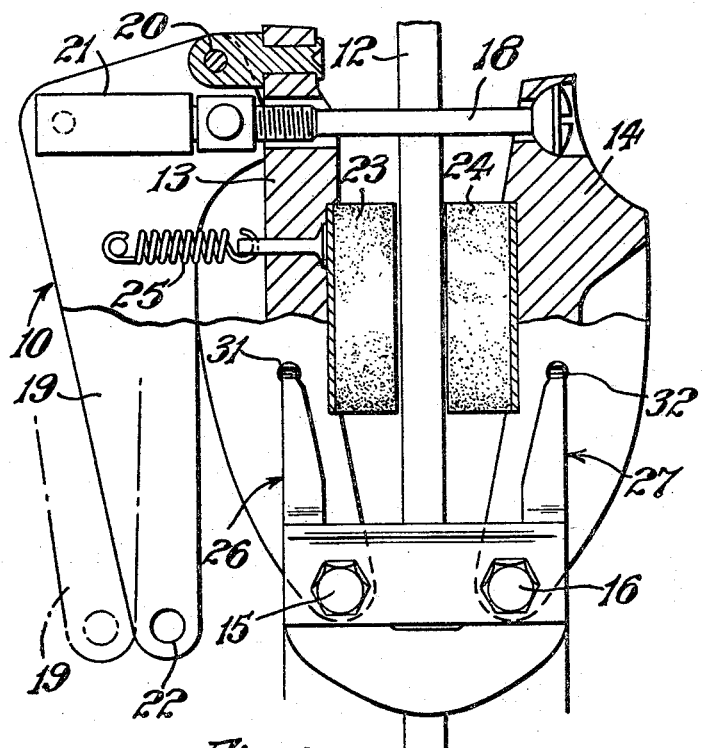
FIGURE 2 shows, partly in cross-section, part of the brake shown in FIGURE 1, viewed in the direction of the arrow "A"

The free end of the lever 19 is provided with a hole 22 for the attachment of a brake-operating rod or cable thereto, and is angularly movable by said rod or cable about is pivot 20 so that when the lever 19 is moved to a position as indicated in dotted lines in FIGURE 2, to apply the brake 10, the pressure plate 13 is moved angularly towards the disc 12 by the force exerted by the lever pivot 20 while the opposite pressure plate 14 is moved towards the disc by the force exerted by the operating rod 18. Friction pads 23 and 24 secured, respectively, to the pressure plates 13 and 14 then frictionally engage the surface of the disc. A return spring 25 is connected between the pressure plate 13 and the lever 19 to restore the lever to the position shown in full lines in FIGURE 2 on release of the brake.

The automatic adjustment device 21 is provided on the lever end of the operating rod 18 to compensate for wear on the friction pads by shortening the effective length of the operating rod 18, thereby maintaining a constant angular travel of the lever 19 to apply the brakes. The automatic adjustment device may be of any suitable form such as the kind described in my co-pending application Serial No. 116,316, filed June 12, 1961.

Figure 3:
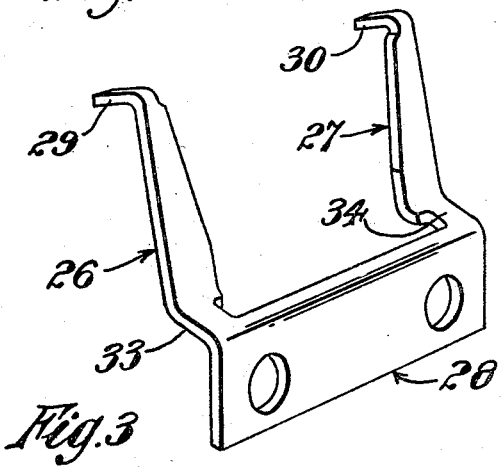
FIGURE 3 is a perspective view of a structure comprising a pair of retraction devices.

A pair of retraction devices comprise members 26, 27, made from annealed brass, copper, or similar soft metal, which are joined together to form the limbs of a U-shaped structure 28 (see FIGURE 3). The structure 28 is adapted to straddle the periphery of the disc 12 and is secured at its base to the housing 17 so that the members 26, 27 extend each adjacent a pressure plate.

The members 26, 27 extend from the base of the U-shaped structure and are bent at their free ends to form lugs 29, 30 which engage, respectively, recesses 31, 32 in the pressure plates 13 and 14 and are moved with the pressure plates when the brake is applied. The members 26, 27 are bent adjacent to the base of the U-shaped structure transversely relative to the radial sides of said disc to form crank shaped portions 33, 34, respectively and these portions are twisted when the brakes are applied and the free ends of the limb members 26, 27 are moved towards one another. If the amount by which the ends of the members are moved is not sufficient to impart a permanent torsional deformation to the crank shaped portions 33, 34 of the members when twisted, the inherent resilience of the crank shaped portions 33, 34 will retract the pressure plates to their rest position through a fixed amount. If, following wear of the pads 23, 24, the pressure plates are moved towards one another sufficiently to impart permanent torsional deformation to the twisted portions, the elasticity of the twisted portions will still withdraw the pressure plates by the same fixed amount.

The advantage of the retraction devices described, which makes use of torsional characteristics, over retraction devices which make use of bending characteristics is that the force applied by each device to retract its associated pressure plate is more uniform than the force applied by a device of the latter type as the deflection of the members 26, 27, resulting from wear of the pads, increases. This is because the point at which each member 26, 27 yields to take up the permanent torsional deformation referred to above, that is, the crank shaped portion of the member, is always at the same effective distance from the point of application of the retraction force on the associated pressure plate.

Having now described my invention, what I claim is:

1. A disc brake comprising a rotatable disc, a friction pad movable axially with respect to the disc to frictionally engage said disc, a non-rotatable support associated with said friction pad to locate the pad in a fixed angular position relative to the axis of the disc, means for effecting said frictional engagement, and a retraction device for moving the pad away from the disc, said device comprising a member secured at one end to the non-rotatable support and associated at its other end with the pad, the member having a crank shaped portion between its ends capable of undergoing torsional deformation when the pad is moved towards the disc and having sufficient inherent torsional resilience to retract the pad from the disc a predetermined amount when the braking pressure is removed.

2. A disc brake comprising a rotatable disc, pair of axially-aligned friction pads, a pair of pressure plates located one on each of the opposite sides of the disc and each carrying one of said friction pads, a non-rotatable support on which said pressure plates are pivotally mounted, means provided for angularly moving the pressure plates about their respective pivots to effect frictional engagement between the friction pads and the disc, and a pair of retraction devices for the pads, each device comprising a member secured at one end to the non-rotatable support and asociated at its other end with the pressure plate carrying the pad, the member having a crank shaped portion adjacent the support capable of undergoing elastic torsional deformation when the pad is moved towards the disc and permanent torsional deformation as the pad wears, said crank shaped portion having sufficient torsional resilience to retract the pad to a minimum predetermined distance from the disc after each braking application, when the braking pressure is removed, as the pad progressively wears.

3. A disc brake according to claim 2 wherein the members forming the pair of retraction devices are joined to form a U-shaped structure the base of which is secured to the non-rotatable support.

4. A disc brake according to claim 2 in which each member is attached to its associated pressure plate by the engagement of a lug formed on the member with a recess in the pressure plate.

5. A disc brake comprising a rotatable disc, a pair of axially aligned friction pads one adjacent each radial side of said disc, a non-rotatable support, means mounted on said non-rotatable support to move asid friction pads into frictional engagement with said disc, and means to withdraw said friction elements comprising a base mounted on said non-rotatable support, a crank shaped portion extending from said base transversely relative to the radial sides of said disc and an arm extending from said crank shaped portion into engagement with said means to move one of said friction pads into engagement with said disc, said crank shaped portion being capable of torsional deformation when said pad is moved towards said disc and having sufficient inherent torsional resilience to retract said means and said pad to free said pad from frictional engagement with said disc when braking pressure is removed.

References Cited in the file of this patent

FOREIGN PATENTS 1,207,766    France _____ Sept. 7, 1959